US010470439B2

(12) United States Patent
Dishong

(10) Patent No.: US 10,470,439 B2
(45) Date of Patent: Nov. 12, 2019

(54) TURKEY SPUR SHEATH REMOVAL TOOL AND METHOD

(71) Applicant: Toby Dishong, Clymer, PA (US)

(72) Inventor: Toby Dishong, Clymer, PA (US)

( * ) Notice: Subject to any disclaimer, the term of this patent is extended or adjusted under 35 U.S.C. 154(b) by 287 days.

(21) Appl. No.: 15/482,683

(22) Filed: Apr. 7, 2017

(65) Prior Publication Data

US 2017/0290299 A1  Oct. 12, 2017

Related U.S. Application Data

(60) Provisional application No. 62/320,243, filed on Apr. 8, 2016.

(51) Int. Cl.
 *A01K 17/00* (2006.01)
(52) U.S. Cl.
 CPC .................................. *A01K 17/00* (2013.01)
(58) Field of Classification Search
 CPC ..................................................... A01K 17/00
 USPC ............. 452/132, 102–105, 1–7; 7/125, 127, 7/128–131
 See application file for complete search history.

(56) References Cited

U.S. PATENT DOCUMENTS

| | | | | |
|---|---|---|---|---|
| 3,026,613 A | | 3/1962 | Nelson | |
| 3,777,323 A | * | 12/1973 | Ingram | H01R 43/042 7/107 |
| 5,964,131 A | * | 10/1999 | Seber | B25F 1/003 7/128 |
| 6,493,892 B2 | * | 12/2002 | Kang | B25C 3/006 7/125 |
| 7,103,934 B1 | * | 9/2006 | Hsu | B25B 7/00 7/125 |
| 7,114,208 B1 | * | 10/2006 | Borst | B25B 7/02 7/108 |
| 7,258,603 B1 | * | 8/2007 | Martin | A22C 29/024 452/6 |
| 7,481,700 B1 | * | 1/2009 | Leboeuf, Jr. | A22C 29/024 452/6 |
| 8,276,486 B2 | * | 10/2012 | Hsieh | B25B 7/08 81/177.8 |
| 8,800,411 B2 | * | 8/2014 | Seemangal | B25B 7/02 7/107 |
| 9,555,533 B2 | * | 1/2017 | Leach | B25F 1/003 |

* cited by examiner

*Primary Examiner* — Richard T Price, Jr.
(74) *Attorney, Agent, or Firm* — Integrity Patent Group; Charles E. Runyan

(57) ABSTRACT

A turkey spur sheath removal tool includes a first pivoting member, a second pivoting member, and a hinge connecting the first and second pivoting members. Each pivoting member includes a handle, a cutting blade, and a gripping region. The turkey spur sheath removal tool is useful for severing and removing the spur sheath from a turkey leg for cleaning or trophy purposes.

18 Claims, 5 Drawing Sheets

TURKEY SPUR SHEATH REMOVAL TOOL AND METHOD

CROSS-REFERENCE TO RELATED APPLICATION

The present application is related to and claims priority to U.S. Provisional Patent Application No. 62/320,243 filed Apr. 8, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of shearing devices of existing art and more specifically relates to cutting tools.

2. Description of Related Art

Turkey hunters may enjoy cutting off and keeping turkey spurs. Hunters may leave turkey spurs on the turkey's feet; however after time, the flesh on the feet begins to deteriorate. It may take an extensive amount of time to remove the spurs in the field, forcing the hunter to haul the turkey home or to a taxidermy shop for spur removal. A suitable solution is desired.

U.S. Pat. No. 3,026,613 to Carl R. Nelson relates to an animal dehorner. The described dehorner includes a dehorner for animal horns, which requires less effort on the part of the operator thereof, and which affords a less obstructed view, whereby the operator is enabled, following a first operation of removal of a horn, to more easily and accurately work upon the remaining stub and produce a natural polled appearance. A further object of the invention is the provision of removable and interchangeable handle bars, in an arrangement which enables using short or long handle bars, and removal of the bars, for compact storage and transportation of the device.

BRIEF SUMMARY OF THE INVENTION

In view of the foregoing disadvantages inherent in the known cutting device art, the present disclosure provides a novel turkey spur sheath removal tool and method. The general purpose of the present disclosure, which will be described subsequently in greater detail, is to provide a turkey spur sheath removal tool and method.

The turkey spur sheath removal tool may include a first pivoting member, a second pivoting member, and a hinge connecting the first and second pivoting members. The first pivoting member may itself include a first proximal end, a first distal end, a first front side, a first back side, a first blade, a first handle, and a first concavity. The second pivoting member may include a second proximal end, a second distal end, a second front side, a second back side, a second blade, a second handle, and a second concavity.

The first pivoting member and the second pivoting member are configured to close about a turkey spur, in such a way that squeezing the first and second handles in relation to each other cause the first and second blades to close in a scissoring action. In the same way, squeezing the first and second handles cause the first and second concavities to close as well.

In preferred embodiments the handle ends of the pivoting members are longer than the blade ends, such that squeezing the handles provides sufficient leverage to operate the cutting and gripping functions of the blades and concavities. The hinge functions as a fulcrum for providing leverage to the blades and concavities when the handles are squeezed. The hinge is located between the blade end and the handle end of each pivoting member. In a first embodiment, the concavities for gripping a turkey spur sheath are located on the handle side of the hinge. In a second embodiment, the concavities are located on the blade side of the hinge. In either configuration, squeezing the handles imparts pressure on both the blades and concavities and any turkey spur sheath inserted therewithin, and the cutting device may be manipulated to impart either a squeezing or twisting force upon the turkey spur sheath.

Preferably, the blades may be concave cutting edges, and may be chisel ground edges positioned inverse to each other so that the bevel or grind of one blade faces to the opposite side of the other. The blade edges contact each other when the handles are squeezed in a scissoring action. The blades may be constructed of a material sufficiently strong to effectively sever keratin and bone, such as a high-strength steel alloy.

The concavities are configured to receive a turkey spur and tightly grip the spur sheath when the handles are squeezed. The concavities may include a high-friction surface, such as a rubber coating, which aids in gripping the spur sheath. The concavities are each hemispherically shaped, and are recessed into the body of each pivoting member. In this configuration, the cutting tool may be used to grip and subsequently twist the spur sheath to remove the turkey spur sheath from the bone spur.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a turkey spur sheath removal tool and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a cutting tool and more particularly to a turkey spur sheath removal tool and method as used to improve the efficiency and convenience for removal of turkey spur sheaths.

Generally speaking, the turkey spur sheath removal tool disclosed herein provides turkey hunters with a spur sheath cutting device capable of cutting and removing turkey spur sheaths from their legs in an efficient manner. The device features two handles designed to operate dual-rounded blades for cutting the spur sheath, as well as opposing gripping surfaces to remove the spur sheath from the bone spur. The device eliminates the need to haul a turkey home, allowing users to remove the spur sheaths and dispose of the unused portions of the turkey in a convenient manner. The device allows hunters to collect spur sheaths off turkey legs for souvenirs, collections, and/or spur necklaces. The present invention also offers a much easier, safer, and more convenient method for removing spur sheaths from a turkey without leg bone or tissue decaying.

The device may include two members each including a squeezable gripping handle, a rounded blade, and a gripping surface. There is a sharp-oval cutting edge on the nose of the cutting tool, slight offset, configured to cut the turkey spur sheath from the leg. There is a hemispherical concavity placed near the hinge configured to grip the spur sheath and twist it off the bone mass. The device enables hunters to quickly cut and cleanly extract spur sheaths from the legs with no bone, eliminating the need to take the legs home. The device allows hunters to keep spur sheaths without leg bone or tissue decay.

In a preferred embodiment, the device may be constructed using steel and other suitable materials. The device may feature a 4" long handle, a 1.25" diameter cutting nose, and approximately 1.5" of straight body with an oval grip.

Figure 1:
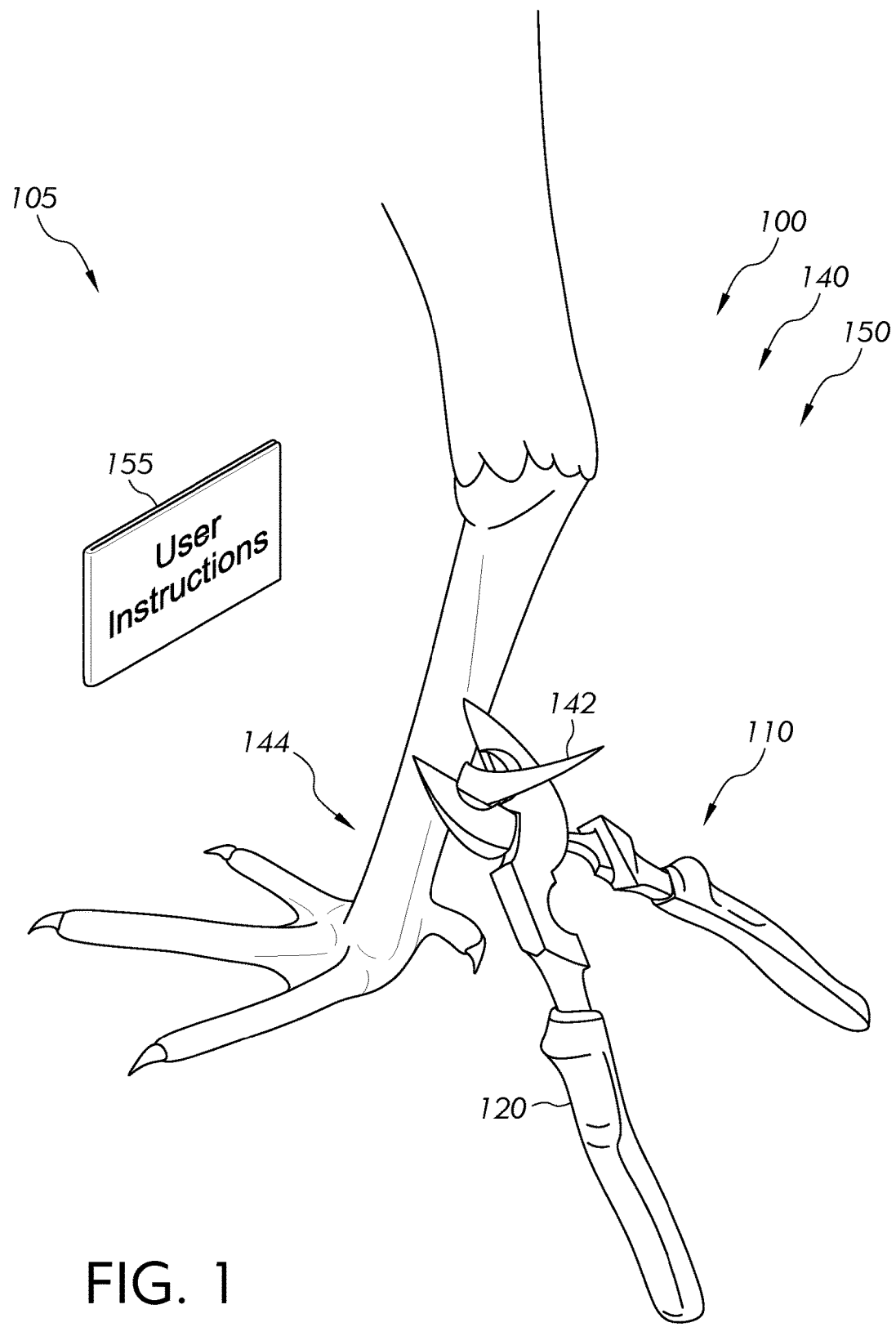
FIG. 1 is a perspective view of the cutting device during an 'in-use' condition, according to an embodiment of the disclosure.

Referring now more specifically to the drawings by numerals of reference, there is shown in FIGS. 1-4, various views of a cutting device 100. FIG. 1 shows a cutting device 100 during an 'in-use' condition 150, according to an embodiment of the present disclosure. Here, the cutting device 100 may be beneficial for use by a user 140 to remove turkey spur sheaths.

According to one embodiment, the cutting device 100 may be arranged as a kit 105. In particular, the cutting device 100 may further include a set of instructions 155. The instructions 155 may detail functional relationships in relation to the structure of the cutting device 100 (such that the cutting device 100 can be used, maintained, or the like, in a preferred manner).

FIG. 1 shows cutting device 100 according to an embodiment of the present disclosure. As above, the cutting device 100 may include first pivoting member 110 and second pivoting member 120, being pivotably connected by hinge 130. First pivoting member 110 and second pivoting member 120 are configured to close about turkey spur sheath 142; cutting tool 100 being configured to remove turkey spur sheath 142.

Figure 2:
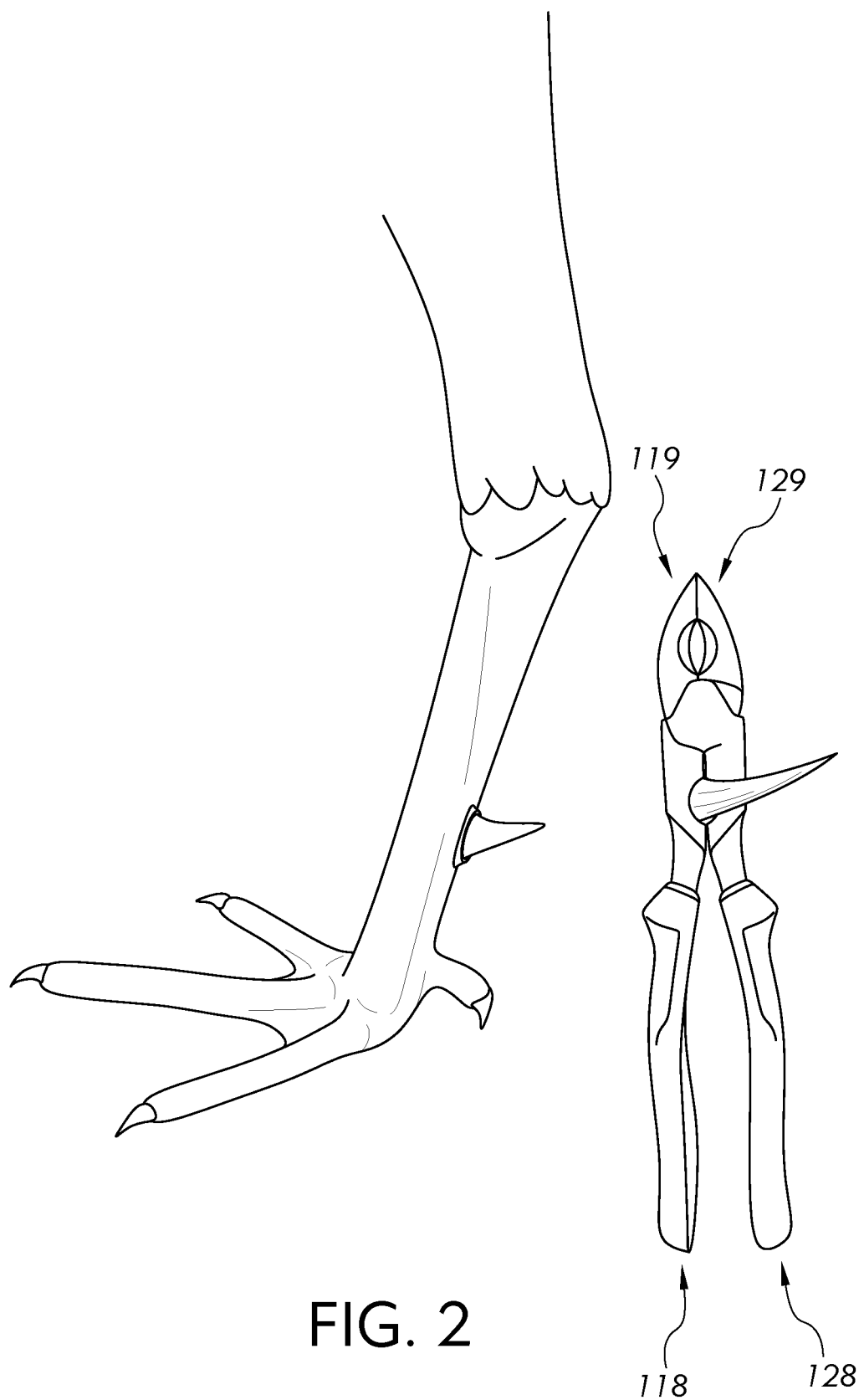
FIG. 2 is a perspective view of the cutting device of FIG. 1 during an 'in-use' condition, according to an embodiment of the present disclosure.

Referring now to FIG. 2 showing cutting device 100 in an in-use condition. First pivoting member 110 may include first proximal end 118 and first distal end 119. Second pivoting member 120 may include second proximal end 128 and second distal end 129. First pivoting member 110 and second pivoting member 120 may be configured to grip turkey spur sheath 142 and impart a twisting force to snap off turkey spur sheath 142.

Figure 3:
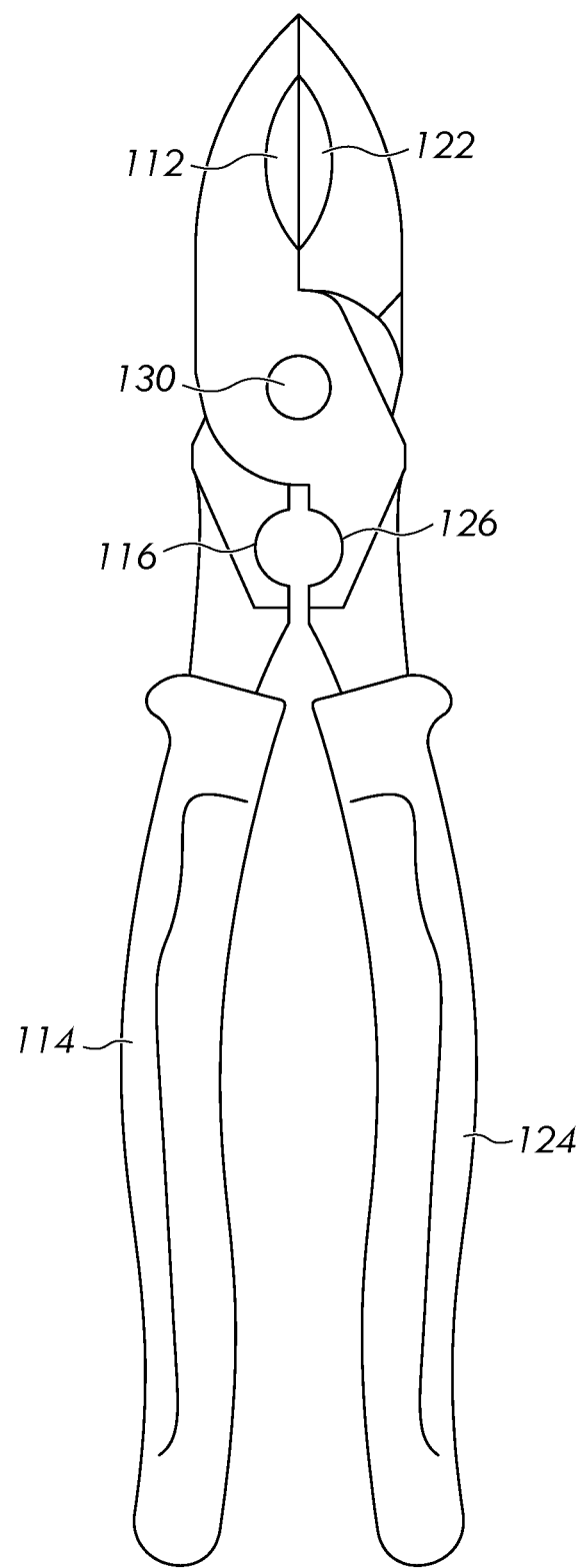
FIG. 3 is a perspective view of the cutting device of FIG. 1, according to an embodiment of the present disclosure.

FIG. 3 is a perspective view of the cutting device 100 of FIG. 1, according to an embodiment of the present disclosure. First pivoting member 110 may further include first blade 112, first handle 114, and first concavity 116. Second pivoting member 120 may further include second blade 122, second handle 124, and second concavity 126. First pivoting member 110 and second pivoting member 120 may be pivotably connected by hinge 130.

First handle 114 of first pivoting member 110 and second handle 124 of second pivoting member 120 cause first blade 112 of first pivoting member 110 and second blade 122 of second pivoting member 120 to close when manipulated, particularly in a squeezing action. Likewise, first handle 114 of first pivoting member 110 and second handle 124 of second pivoting member 120 cause first concavity 116 of first pivoting member 110 and second concavity 126 of second pivoting member 120 to close when manipulated.

First proximal end 118 of first pivoting member 110 and second proximal end 128 of second pivoting member 120 are preferably longer than first distal end 119 of first pivoting member 110 and second distal end 129 of second pivoting member 120; first proximal end 118 of first pivoting member 110 and second proximal end 128 of second pivoting member 120 being configured to apply sufficient leverage upon first blade 112 of first pivoting member 110 and second blade 122 of second pivoting member 120 for severing turkey spur sheath 142.

Hinge 130 is configured to transmit leverage from first handle 114 of first pivoting member 110 to first blade 112 of first pivoting member 110, and from second handle 124 of second pivoting member 120 to second blade 122 of second pivoting member 120. Hinge 130 may be pinned. Hinge 130 is located between first proximal end 118 of first pivoting member 110 and first distal end 119 of first pivoting member 110, and accordingly, is located between located between second proximal end 128 of second pivoting member 120 and second distal end 129 of second pivoting member 120.

First pivoting member 110 and second pivoting member 120 comprise levers configured to squeeze and twist turkey spur sheath 142. First blade 112 of first pivoting member 110 and second blade 122 of second pivoting member 120 comprise chisel ground, concave cutting edges. First pivoting member 110 and second pivoting member 120 comprise scissors including high-strength steel blades configured to sever keratin. Other suitably equivalent materials may be used.

First blade 112 of first pivoting member 110 is disposed on first pivoting member 110, while second blade 122 of second pivoting member 120 is disposed on second pivoting member 120. First blade 112 of first pivoting member 110 and second blade 122 of second pivoting member 120 make contact when first handle 114 of first pivoting member 110 and second handle 124 of second pivoting member 120 are squeezed.

First concavity 116 of first pivoting member 110 and second concavity 126 of second pivoting member 120 each preferably include high friction material coating configured to grip turkey spur sheath 142. First concavity 116 of first pivoting member 110 and second concavity 126 of second pivoting member 120 comprise hemispherical voids in first pivoting member 110 and second pivoting member 120 configured to receive turkey spur sheath 142.

Figure 4:
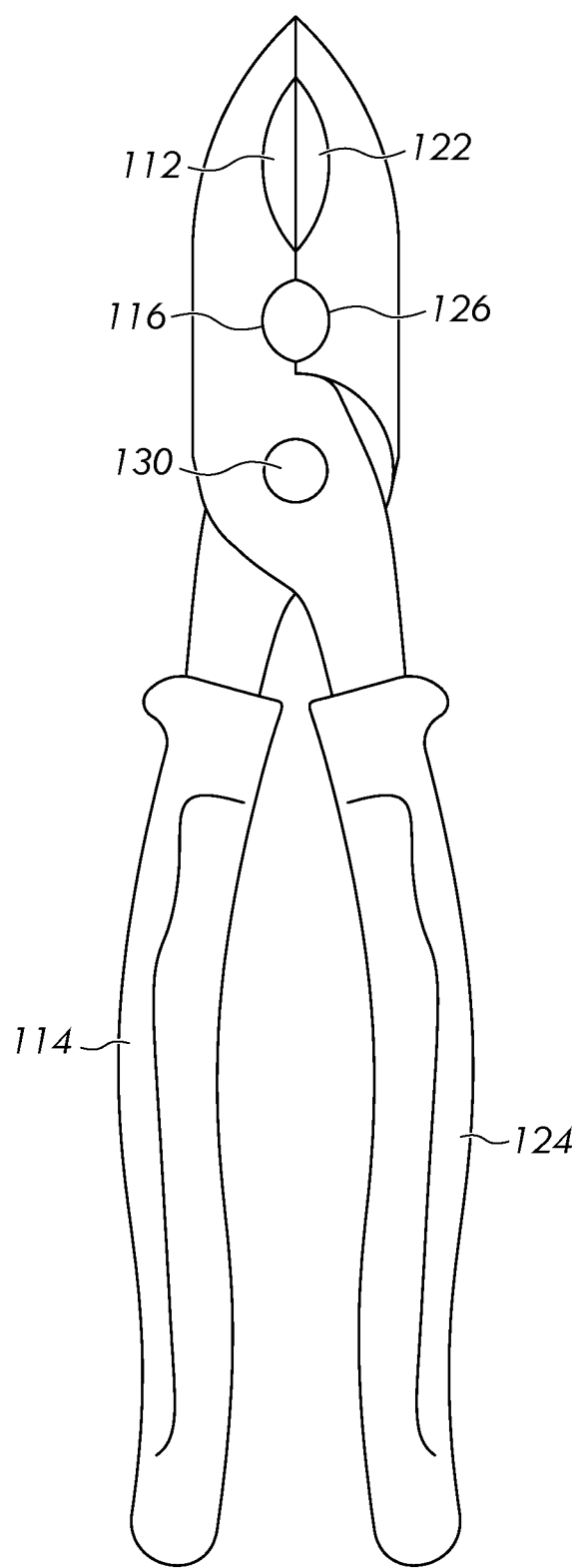
FIG. 4 is a perspective view of an alternative embodiment of the cutting device of FIG. 1, according to an embodiment of the present disclosure.

FIG. 4 is a perspective view of an alternative embodiment of the cutting device 100 of FIG. 1, according to an alternative embodiment of the present disclosure. In this embodiment, both first blade 112 of first pivoting member 110 and first concavity 116 of first pivoting member 110 are located on first distal end 119 of first pivoting member 110. Likewise, both second blade 122 of second pivoting member 120 and second concavity 126 of second pivoting member 120 are located on second distal end 129 of second pivoting member 120.

Figure 5:
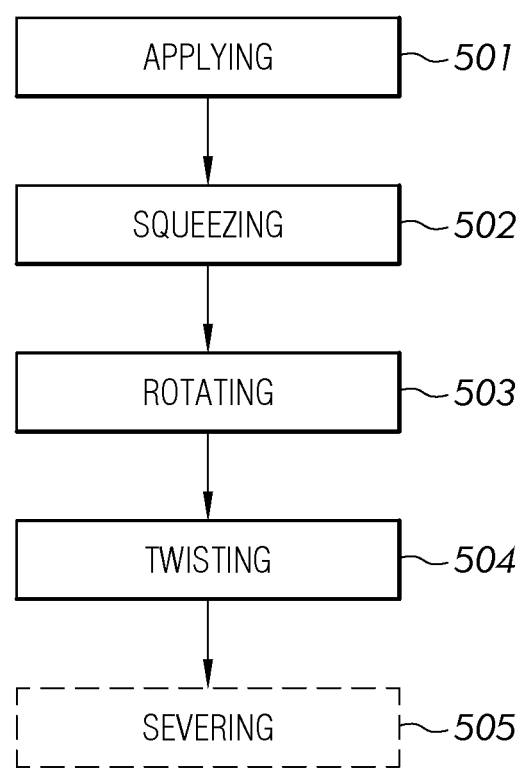
FIG. 5 is a flow diagram illustrating a method of use for removing turkey spur sheaths, according to an embodiment of the present disclosure.

FIG. 5 is a flow diagram 550 illustrating a method for removing a turkey spur 500, according to an embodiment of the present disclosure. In particular, the method for removing a turkey spur sheath 500 may include one or more components or features of the cutting device 100 as described above. As illustrated, the method for removing a turkey spur sheath 500 may include the steps of: step one 501, applying first blade 112 of first pivoting member 110 and second blade 122 of second pivoting member 120 of cutting device 100 about either side of turkey spur sheath 142; step two 502, squeezing first handle 114 of first pivoting member 110 and second handle 124 of second pivoting member 120 of cutting device 100 to sever turkey spur sheath 142; step three 503, rotating cutting device 100 to sever turkey spur sheath 142; and step four 504, twisting cutting device 100 to break and remove turkey spur sheath 142. Upon reading this specification, it should be appreciated that, under appropriate circumstances, considering such issues as user preferences, design preference, structural requirements, marketing preferences, cost, available materials, technological advances, etc., other arrangements such as, for example, placement of the cutting blades and gripping concavities, or configuration of the handles, etc., may be sufficient.

It should be noted that, under appropriate circumstances, considering such issues as design preference, user preferences, marketing preferences, cost, structural requirements, available materials, technological advances, etc., other methods for removing a turkey spur sheath (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A cutting device, the cutting device comprising:
   a first pivoting member including
      a first proximal end,
      a first distal end,
      a first inner side,
      a first outer side,
      a first blade,
      a first handle,
      and
      a first concavity;
   and
   a second pivoting member including
      a second proximal end,
      a second distal end,
      a second inner side,
      a second outer side,
      a second blade,
      a second handle,
      and
      a second concavity;
   and
   a hinge pivotably connecting the first pivoting member and the second pivoting member;
   wherein
      the cutting device has two configurations
         an open configuration,
         and
         a closed configuration in which the first blade approaches the second blade in a contact region and a non-contact region.

2. The cutting device of claim 1 further comprising a second contact region.

3. The cutting device of claim 2 wherein the non-contact region is disposed between the contact region and the second contact region.

4. The cutting device of claim 3, wherein closing the first handle and the second handle causes the first concavity and the second concavity to close when manipulated.

5. The cutting device of claim 4, wherein the first proximal end and the second proximal end are longer than the first distal end and the second distal end, the first proximal end and the second proximal end being configured to apply sufficient leverage upon the first blade and the second blade for severing the turkey spur sheath.

6. The cutting device of claim 5, wherein the hinge comprises a fulcrum configured to transmit leverage from the first handle to the first blade and from the second handle to the second blade.

7. The cutting device of claim 6, wherein the first pivoting member and the second pivoting member comprise levers configured to impart a squeezing force or a twisting force on the turkey spur sheath.

8. The cutting device of claim 7, wherein the first blade the and the second blade comprise concave cutting edges.

9. The cutting device of claim 8, wherein the first blade and the second blade comprise chisel ground cutting edges.

10. The cutting device of claim 9, wherein the first blade and the second blade form scissors.

11. The cutting device of claim 10, wherein the first blade and the second blade comprise a high-strength steel sufficient for cutting keratin.

12. The cutting device of claim 11, wherein the first blade is disposed on the first inner side.

13. The cutting device of claim 12, wherein the second blade is disposed on the second outer side.

14. The cutting device of claim 12, wherein the first concavity and the second concavity each include a high friction material coating configured to grip the turkey spur sheath.

15. The cutting device of claim 14, wherein the first concavity and the second concavity comprise voids in the first pivoting member and the second pivoting member configured to receive the turkey spur sheath.

16. The cutting device of claim 15, further comprising set of instructions; and
wherein the cutting device is arranged as a kit.

17. A turkey spur sheath removal tool, the cutting device comprising:
    a first pivoting member including
        a first proximal end,
        a first distal end,
        a first inner side,
        a first outer side,
        a first blade,
        a first handle,
        and
        a first concavity;
    and
    a second pivoting member including
        a second proximal end,
        a second distal end,
        a second inner side,
        a second outer side,
        a second blade,
        a second handle,
        and
        a second concavity,
        and
a hinge pivotably connecting the first pivoting member and the second pivoting member;
wherein
    the cutting device has two configurations
        an open configuration,
        and
        a closed configuration in which the first blade approaches the second blade in two contact regions at the ends of the first blade and the second bland and a non-contact region in the middle of the first blade and second blade,
wherein closing the first handle and the second handle cause the first concavity and the second concavity to close when manipulated,
wherein the first proximal end and the second proximal end are longer than the first distal end and the second distal end,
the first proximal end and the second proximal end being configured to apply sufficient leverage upon the first blade and the second blade for severing the turkey spur sheath,
wherein the hinge comprises a fulcrum configured to transmit leverage from the first handle to the first blade, and from the second handle to the second blade,
wherein the hinge comprises a pinned joint,
wherein the hinge is located between the first proximal end and the first distal end, and the hinge is located between the second proximal end and the second distal end,
wherein the first pivoting member and the second pivoting member comprise levers configured to impart a squeezing force and a twisting force on the turkey spur sheath,
wherein the first blade and the second blade comprise concave cutting edges,
wherein the first blade and the second blade comprise chisel ground cutting edges,
wherein the first pivoting member and the second pivoting member comprise scissors configured to sever keratin,
wherein the first blade and the second blade comprise a high-strength steel sufficient for cutting keratin,
wherein the first blade is disposed on first inner side,
wherein the second blade is disposed on second outer side,
wherein the first blade and the second blade make contact when the first handle and the second handle are squeezed,
wherein the first concavity and the second concavity each include a high friction material coating configured to grip the turkey spur sheath,
and
wherein the first concavity and the second concavity comprise voids in the first pivoting member and the second pivoting member configured to receive the turkey spur sheath.

18. A method of removing turkey spur sheaths, the method comprising the steps of:
applying a first blade of a first pivoting member and a second blade of a second pivoting member of a cutting device about either side of a turkey spur sheath,
squeezing a first handle and a second handle of the cutting device to sever the turkey spur sheath,
rotating the cutting device to sever the turkey spur sheath, and
twisting the cutting device to break and remove the turkey spur sheath.

* * * * *